Dec. 17, 1940.     H. KOHN     2,225,480

EPICYCLIC TRANSMISSION GEAR

Filed April 5, 1938     2 Sheets-Sheet 1

Inventor:
Hans Kohn
by Michaelis & Michaelis
attys.

Dec. 17, 1940.   H. KOHN   2,225,480
EPICYCLIC TRANSMISSION GEAR
Filed April 5, 1938   2 Sheets-Sheet 2
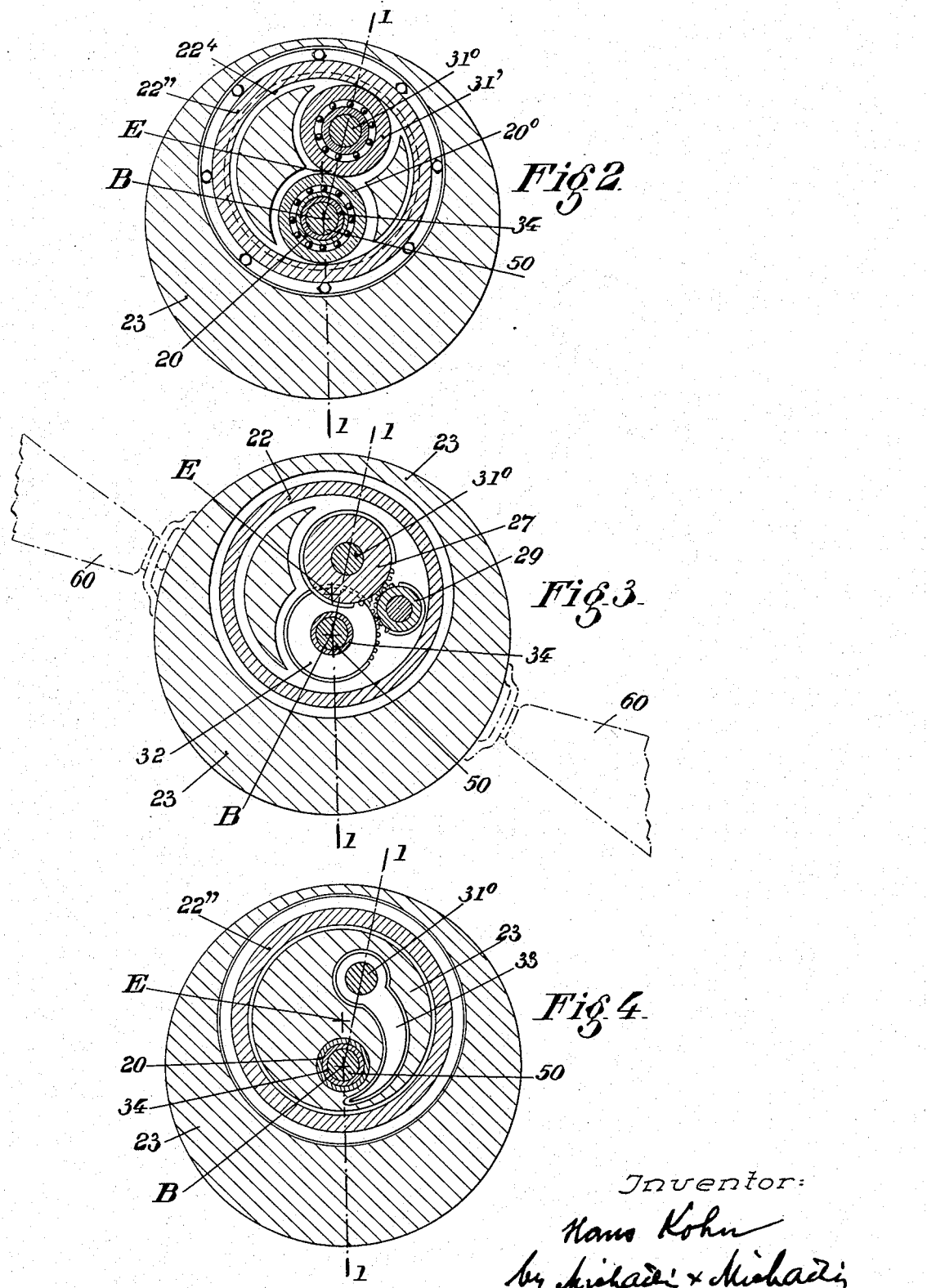

Patented Dec. 17, 1940

2,225,480

UNITED STATES PATENT OFFICE 2,225,480

EPICYCLIC TRANSMISSION GEAR

Hans Kohn, Stoetten, Oberamt Geislingen, near Stuttgart, Germany

Application April 5, 1938, Serial No. 200,081
In Germany April 7, 1937

16 Claims. (Cl. 74—285)

This invention relates to epicyclic transmission gears in which the transmission ratio between the driving and driven shafts is altered by alteration of the rate of rotation of the planet carrier and in which the driving torque increases with decreasing speed of the driven shaft.

In accordance with the invention, means are arranged on the planet carrier which relieve it more or less completely of torque when the gear is transmitting power. In accordance with the invention, by the coaction of the transmitting and regulating parts, or of the torque acting upon them, an increase in torque as well as a continuous alteration in the transmission ratio can be obtained without the provision of a fixed abutment for these parts or their carriers. These parts are instead rotatably or pivotally mounted on or about one another. To enable the transmission ratio to be altered with a minimum expenditure of power, it is desirable to provide a gear train, preferably in the form of an epicyclic gear train, preferably in the form of an epicyclic gear, the speed of one part of which is adjustable.

Some of the numerous embodiments of the principle of the invention which are possible are diagrammatically illustrated by way of example in the drawings, in which:

Figures 2 to 4 are cross sections on lines II—II, III—III and IV—IV respectively in Figure 1.

Figure 1:
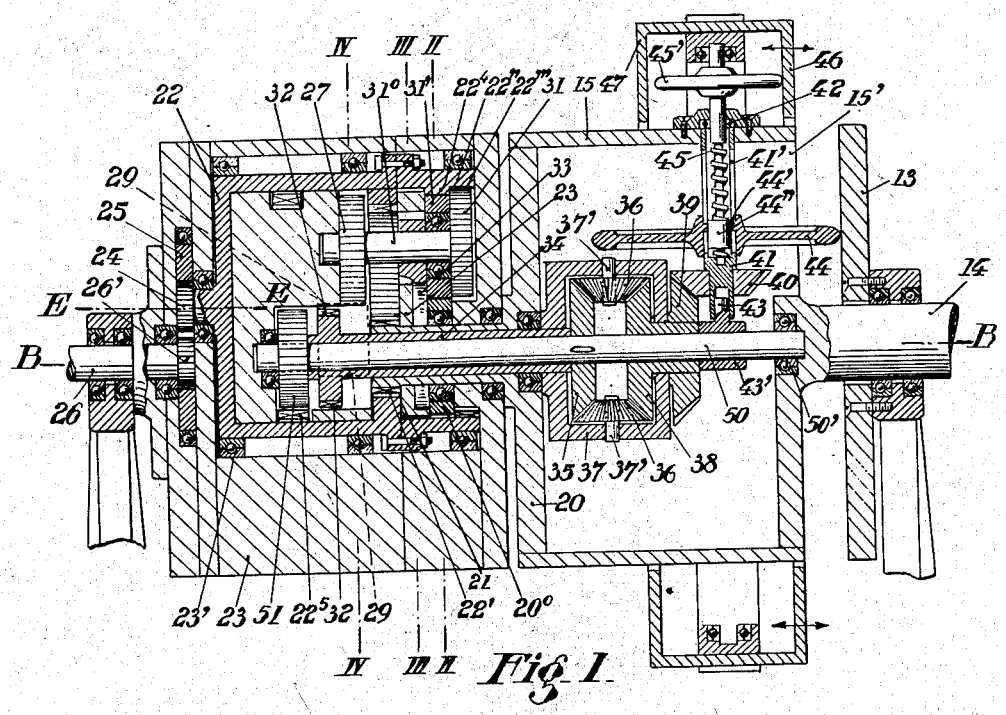
Figure 1 is a longitudinal section through one embodiment of the new transmission gear.

In the arrangement of Figures 1 to 4, the power received by the driving shaft 14 is transmitted through the casing 15 to a hollow shaft 20 which has a pinion 21 fixed to it. This pinion meshes with the teeth 22' of an annulus 22 mounted at 23' in a carrier 23, called hereinafter a planet carrier, in which it can rotate about its axis E—E.

The annulus 22 carries coaxially a pinion 24 which meshes with an annulus 25 mounted to rotate freely in the planet carrier 23. A pinion 26' on the driven shaft 26 also meshes with the annulus 25. The driving and driven shafts have a common axis B—B.

To the annulus 22 is connected a second somewhat larger toothed annulus 22". A pinion 31 referred to hereinafter as the abutment pinion meshes in the teeth 22''' of the annulus 22". The spindle 31⁰ of the abutment pinion is mounted in the planet carrier 23 and has firmly attached to it a toothed wheel 27 which meshes with a pinion 29 mounted in the planet carrier 23 and itself meshing with the regulating pinion 32 on the regulating shaft 34. The regulating shaft 34 is hollow and lies within the hollow driving shaft 20. The abutment pinion 31 and the toothed wheel 27 are disposed in such a manner relatively to the teeth 22''' of the annulus 22" and to the intermediate pinion 29 that they mesh in the part of the teeth 22" which is urged towards the axis B—B (Figure 4).

In order to prevent the pinion 31 from jamming in the teeth 22''' and in order to keep the teeth in easy running engagement, special abutments are provided which maintain the appropriate distance between these wheels. These abutments are in the form of a roller 31' on the shaft 31⁰ and a roller 20⁰ on the driving shaft 20 which bear against the track 22⁴ (see Figure 2).

These rollers are also able to compensate to some extent the torque exerted by the driving annulus 22 which is eccentrically mounted in the planet carrier 23. They may, for example, counteract this torque almost entirely leaving only an amount which is convenient or necessary for regulation.

As the toothed wheels 22', 22", 31 and the rollers 22⁴, 31', always make the same movements, reference to the wheels 22', 22", 31 will in what follows be understood, where the context allows, to include reference to the rollers.

The slight play between the teeth 22''' and the teeth of the pinion 31 can also be maintained by mounting the shaft 31⁰ of the two pinions 31 and 27 with a certain amount of play on the planet carrier 23, as illustrated in Figure 4 in which the shaft 31⁰ is mounted in a tongue shaped member 33 which has a certain freedom of movement in the planet carrier 23.

Let us first consider the case in which the planet carrier 23 is stationary. Let it also be assumed, as is illustrated in the drawings, that the annulus 22' has twice as many teeth as the driving pinion 21 and that the pinions 24 and 26' are of approximately the same size. When the driving shaft 20 makes one clockwise revolution, the annulus 22 is carried round by the driving pinion 21 and makes half a revolution clockwise. The driven shaft 26 which is geared up to it also makes half a revolution clockwise.

If it is now desired to reduce the speed of the driven shaft 26, the planet carrier 23 is rotated counterclockwise. The annulus 22 is then swung counterclockwise so that in addition to being rotated clockwise by the driving pinion 21, it also rolls or planetates counterclockwise on the wheel 21, i. e. in the sense opposite to that in which the driving shaft rotates. The speed of the annulus 22 and thus that of the driven shaft 26 is slowed down in accordance with the difference between these two opposite movements.

When the counterclockwise rotation of the planet carrier 23 becomes so great that the entire rotary movement which is transmitted by the driving pinion 21 to the annulus 22 is completely compensated, the annulus remains always parallel to itself while it is carried round with the planet carrier 23. The annulus 22 thus transmits no rotary movement to the driven shaft 26.

If now the stationary driven shaft 26 is set in rotation and its speed gradually increased, the counterclockwise rotation of the planet carrier 23 is progressively reduced. When the planet carrier 23 is stationary, the first described state of affairs is reached in which the speed of the driven shaft 26 is half that of the driving shaft 20. In order to increase the driven speed up to the driving speed, the planet carrier 23 is set in rotation clockwise, i. e. in the same direction as the driving shaft. The driven shaft 26 is completely carried round by the shaft 20, and thus the direct drive condition is obtained when the planet carrier 23 rotates at the speed of the driving shaft 20. All the parts of the gear are then at rest relatively to one another so that the gear behaves like a continuous shaft.

In order to alter the transmission ratio, the speed of the planet carrier 23 thus has to be altered. In order that this shall not entail the expenditure of any appreciable amount of energy for this purpose, the parts are so arranged that the forces acting on the planet carrier 23 more or less counteract one another or even cancel themselves out. Forces which cause rotation of the planet carrier 23 can only be transmitted to it by parts which are mounted upon it eccentrically to its axis B—B.

One of these parts is the annulus 22', 22''. If the driving shaft rotates clockwise, it causes a counterclockwise torque to act on the planet carrier 23. (For the time being, the influence which the abutment pinion 31 and the annulus 27 exercise on the annulus 22', 22'' or on the planet carrier 23 is neglected.)

A further part which tends to turn the planet carrier 23 is the pinion 24 or its journal, particularly if that pinion (unlike the pinion shown in the drawings) meshes directly with the pinion 26' instead of through the annulus 25.

Other parts which tend to rotate the planet carrier 23 against the reaction pressure exerted by the driving parts are the regulating parts, namely the pinions 31, 27 and 29 and the abutment surface 31' in conjunction with the abutment surfaces 22⁴ and 20⁰.

These various parts which are mounted eccentrically on the planet carrier can be made so that the resultant torque acting upon the planet carrier 23 is always as small as may be desired.

In general, it is not undesirable that a slight resultant torque should act on the planet carrier 23 for the purpose of regulating the transmission ratio. In such a case a corresponding torque acts on the regulating pinion 32.

In order that this resultant torque which acts in the same sense as the driving torque may not cause loss of power and in order at the same time to obtain the maximum equalisation of the part on which the regulating means is to act directly, said resultant torque is advantageously caused to supplement the driving torque. This may be done as follows:

Firmly attached to the regulating shaft 34 is a casing 37 of a differential gear in which two planet pinions 36, 36 are freely journalled at 37'. These pinions mesh with a sun wheel 35 fixed to a shaft 50 passing through the hollow shaft 34. This shaft which is supported at 50' on the driving shaft has at its other end a pinion 51 which engages in the teeth 22⁵ of the annulus 22. The planets 36 also mesh with a sun wheel 38 fixed to a bevel wheel 39 meshing with a pinion 40. This pinion is fixed to a shaft 41 which is supported at 42 in the casing 15 and at 43 in a sleeve 43' on the shaft 50. The speed of the shaft 41 can be altered by a friction wheel 44 which is displaceable along it and rolls on the stationary wall 13. The casing 15 is open at 15' to make these parts accessible.

The resultant or residual force acting on the regulating pinion 32 and tending to rotate it clockwise acts through the regulating shaft 34 on the differential casing 37 and is equally divided between the sun wheels 35 and 39 by the pinions 36. The force acting on the wheel 35 is transmitted through the shaft 50, the pinion 51 and the teeth 22⁵ to the annulus 22, which also transmits the driving force of the pinion 22' through its pinion 24 to the drive. This transmission of the regulating force by the pinion 51 is favoured by the fact that this pinion tends to run more rapidly than the annulus 22.

The displacement of the friction wheel 44 along the shaft 41 during the pivoting of these parts about the main axis B—B may be effected, for example, as follows. The shaft 41 is longitudinally slotted. The friction wheel has pins 44' which project through the longitudinal slots 41' and carry within the shaft 41 and nut 44'' of a screwed spindle 45 which carries outside the casing a friction wheel 45'. This friction wheel may be brought selectively into engagement with one of the two walls 46, 47 which are stationary but which may be displaced to some extent at right angles to the axis of the spindle 45. The friction disc 44 may thus be moved selectively upwards or downwards along the shaft 41.

The speed of the annulus 22'' or 22 and that of the planet carrier 23 may be adjusted by the parts 41, 40, 39, 38, 37, 34, 32, 29, 27 and 31 by setting the friction wheel 41 and the transmission ratio thus be altered. The half of the residual regulating pressure transmitted from the wheel 32 through the shaft 34 to the differential casing 37 and thence to the bevel wheel 39, may be transmitted back to the drive by the friction wheel 44 when the wheel 39 engages in the pinion 40.

In many cases, for example where the power transmission is high, it may be desirable to make the annulus 22'' run at a different speed, in particular, a lower speed, than the annulus 22. This may be done for example by means of the arrangement illustrated in Figure 5.

The driving shaft 14 drives the part 15 which has a toothed annulus 16 in which engages pinions 17 mounted for rotation at 17' in a member 20. Firmly attached to each pinion 17 is a pinion 18 which meshes with a pinion 19 fixed to the regulating shaft 34.

The part 20 to which the driving torque is transmitted surrounds the shaft 34 and carries at its end a differential casing 210 on which pinions 210' are freely mounted. They mesh with a sun wheel 210'' to which is fixed a pinion 210'''. These wheels are free to rotate on the regulating shaft 34. The pinion 210''' meshes with the teeth 22' of the annulus 22. The driving torque is transmitted from this annulus through the parts 24, 25 and 26' to the driven shaft 26 as has been described with reference to Figure 1.

On their other side, the pinions 210' mesh with a sun wheel 210⁴ to which is fixed the pinion 210⁵. These two wheels are free to rotate on the driving shaft 20. The pinion 210⁵ meshes with the teeth 22⁶ of the annulus 22'' which is here completely separated from the annulus 22. By proper selection of the relative sizes of the various pinions and toothed wheels, the speed of the annulus 22'' (hereinafter referred to as the regulating annulus) relatively to the driving annulus 22 may be made smaller in accordance with requirements.

As in the case of Figure 1, the abutment pinion 31 which is connected through the parts 31⁰, 27 and 29 to the pinion 32 on the regulating shaft 34 meshes with the teeth 22''' of the regulating annulus 22''. In order to transmit the resultant or residual torque acting on the regulating pinion 32 back to the drive, the pinion 19 on the shaft 34 meshes, as described above, in the pinion 18 which meshes with the pinion 17 which itself meshes with the driving annulus. In this manner, a balance is kept between the pressures acting between the pinions 19, 18 and the pinion 17 and the annulus 16 so that the drive of the disc 15 is transmitted through the shaft 17' to the driving part 20 of the gear.

In many cases, particularly when it is a question of the transmission of relatively small amounts of power, the residual torque acting on the shaft 34 is so small that it is not worth while to transmit it back to the drive. In this case, the parts 15—19 can be omitted and the part 20 be driven directly.

Figure 5:
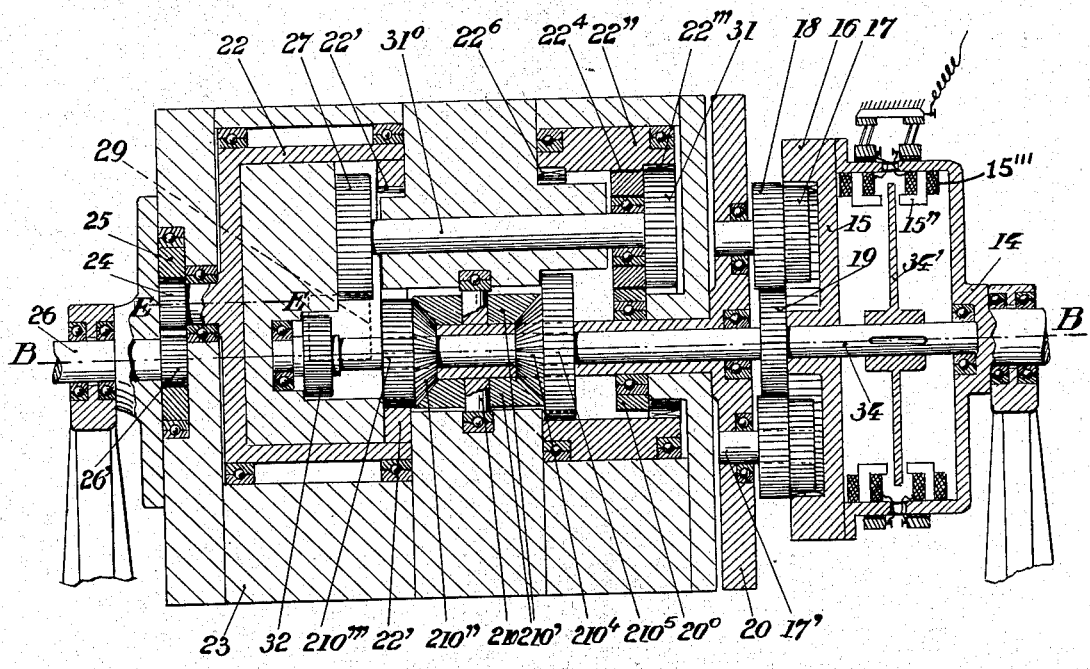
Figure 5 shows another embodiment in longitudinal section.

In the arrangement of Figure 5, the regulation of the speed of the planet carrier 23 by the regulating pinion 32 or its shaft 34 can be effected by any desired means for the purpose of altering the speed of that shaft. For example, a clutch, a driving member or a brake of any desired kind could act upon the shaft 34. For example, an oil clutch, a slipping clutch, an electrical clutch or brake or the like connected to the drive could be used or a friction wheel or like drive.

The means illustrated in Figure 5 for altering the speed of the regulating shaft 34 consists of an electrical eddy current brake. The driving part 15 carries pole shoes 15'' which may be more or less energised by current in the windings 15'''. In the gap between the pole shoes 15'' runs a disc 34' mounted on the regulating shaft 34. In accordance with the energisation of the pole shoes 15'' stronger or weaker eddy currents are produced in the disc 34'. The speed of the shaft 34 may thus be increased to any desired extent and this increase can be effected continuously from rest up to the speed of the drive 15.

The regulation of the shaft 34 may also be effected as shown in Figure 4 by the action of a fluid current for example, a current of air by adjustable propeller blades 60 or the like.

If the sense of rotation of the driven shaft 26 is to be frequently changed so that the torque acting on the planet carrier is frequently reversed, it may be convenient to provide the parts mounted on the shafts 31⁰ in duplicate, the two sets of parts lying symmetrically to the left and to the right of the plane passing through the axes B and E.

Further alterations of the gear may also be carried out within the scope of the invention.

I claim:
1. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing, a member arranged in said gear carrier and adapted to act thereon in a direction eccentric with respect to at least one of said shafts, another member mounted on said driving shaft, and abutting means arranged on said carrier so as to bear against said members, whereby to at least partly counteract the torque acting on said gear carrier when said gearing transmits power.

2. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing and abutting means arranged on said gear carrier so as to bear against said cyclic gear and a member mounted on said driving shaft, whereby to at least partly counteract the torque acting on said gear carrier when said gearing transmits power.

3. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing, rolling means arranged on said cyclic gear, rolling means mounted on said driving shaft and abutting rolling means arranged on said gear carrier so as to bear against both said rolling means, whereby to at least partly counteract the torque acting on said gear carrier when said gearing transmits power.

4. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing, a roller track arranged on said cyclic gear, a roller mounted on said driving shaft and an abutting roller arranged for wedgelike engagement with said roller track and said roller, whereby to at least partly counteract the torque acting on said gear carrier when said gearing transmits power.

5. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing, a roller track arranged on said cyclic gear, a roller mounted on said driving shaft and an abutting roller arranged for wedge-like engagement with said roller and that part of said roller track moving towards the point where said cyclic gear meshes with said pinion, whereby to at least partly counteract the torque acting on said gear carrier when said gearing transmits power.

6. The gearing according to claim 1, wherein the means for regulating the speed of said gear carrier are operatively connected with the cyclic gear.

7. The gearing according to claim 1, wherein the means for regulating the speed of said gear carrier are operatively connected with the cyclic gear by means arranged on the gear carrier.

8. The gearing according to claim 1, wherein the means for regulating the speed of said gear carrier are operatively connected with the cyclic gear by means arranged on the gear carrier, one of said connecting means being arranged to serve as a support for the abutting means.

9. The gearing according to claim 1, wherein the means for regulating the speed of said gear carrier are operatively connected with the cyclic gear by means mounted with some play on and with respect to the gear carrier.

10. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing, means for transmitting back part of the regulating torque to one of said shafts, a member arranged in said gear carrier and adapted to act thereon in a direction eccentric with respect to one of said shafts, another member mounted on said driving shaft, and abutting means arranged on said gear carrier so as to bear against said members, whereby to be at least partly counteract the torque acting on said gear carrier when said gearing transmits power.

11. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing, gearing members connecting a part of said regulating means with either of said shafts, a member arranged in said gear carrier and adapted to act thereon in a direction eccentric with respect to one of said shafts, another member mounted on said driving shaft, and abutting means arranged on said gear carrier so as to bear against said members, whereby to at least partly counteract the torque acting on said gear carrier when said gearing transmits power.

12. Cycloid transmission gearing, comprising in combination, a driving shaft, a driven shaft, a gear carrier mounted for rotation about at least one of these shafts, a pinion mounted on one of these shafts, a cyclic gear meshing with said pinion and rotatably mounted on said gear carrier, gears interposed between said cyclic gear and said driven shaft, means for regulating the speed of said gear carrier to change the transmission ratio of the gearing, a differential gear inserted between parts of said regulating means, a part of said differential gear being operatively connected with said cyclic gear, a member arranged in said gear carrier and adapted to act thereon in a direction eccentric with respect to one of said shafts, another member mounted on said driving shaft, and abutting means arranged on said gear carrier so as to bear against said members, whereby to at least partly counteract the torque acting on said gear carrier when said gearing transmits power.

13. The cycloid transmission gearing according to claim 1, wherein the cyclic gear is provided as an annulus having inside gearing.

14. The cycloid transmission gearing according to claim 1, wherein the cyclic gear is provided as an annulus comprising on its inside a roller tract and a plurality of gearings, the cyclic gear further comprising a plurality of pinions meshing with said gearings.

15. The cycloid transmission gearing according to claim 1, wherein all parts enumerated in said claim with the exception of the two shafts are rotatably mounted on rotary parts.

16. The cycloid transmission gearing according to claim 1, wherein fixed bearings are provided only for the two shafts.

HANS KOHN.